United States Patent [19]

Crivello et al.

[11] Patent Number: 4,981,881

[45] Date of Patent: Jan. 1, 1991

[54] NON-TOXIC ARYL ONIUM SALTS, UV CURABLE COATING COMPOSITIONS AND FOOD PACKAGING USE

[75] Inventors: James V. Crivello, Clifton Park; Julia L. Lee, Schenectady, both of N.Y.

[73] Assignee: General Electric Company, Schenectady, N.Y.

[21] Appl. No.: 383,505

[22] Filed: Jul. 24, 1989

Related U.S. Application Data

[62] Division of Ser. No. 171,063, Mar. 21, 1988, Pat. No. 4,882,201.

[51] Int. Cl.$^5$ .............................................. C08G 59/68
[52] U.S. Cl. ...................................... 522/31; 522/170; 528/408; 528/20
[58] Field of Search ........................................... 522/31

[56] References Cited

U.S. PATENT DOCUMENTS

| | | | |
|---|---|---|---|
| 3,422,152 | 1/1969 | Doub | 562/584 |
| 3,729,313 | 4/1973 | Smith | 522/72 |
| 4,026,705 | 5/1977 | Crivello | 522/15 |
| 4,173,551 | 11/1979 | Crivello | 528/355 |
| 4,192,924 | 3/1980 | Crivello | 521/126 |
| 4,219,654 | 8/1980 | Crivello | 546/342 |
| 4,279,717 | 7/1981 | Eckberg | 522/31 |
| 4,367,251 | 1/1983 | Crivello | 522/31 |
| 4,416,752 | 11/1983 | Crivello | 204/181 |
| 4,632,895 | 12/1986 | Patel | 430/339 |
| 4,835,193 | 5/1989 | Hayase | 522/15 |

*Primary Examiner*—Marion E. McCamish
*Assistant Examiner*—Arthur H. Koeckert
*Attorney, Agent, or Firm*—William A. Teoli; James C. Davis, Jr.; William H. Pittman

[57] ABSTRACT

A method is provided for coating a substrate with a non-toxic irradiation curable epoxy resin composition. There is used an alkoxy-substituted aryl onium salt, in combination with a non-toxic oxirane-containing organic or silicone resin.

3 Claims, No Drawings

NON-TOXIC ARYL ONIUM SALTS, UV CURABLE COATING COMPOSITIONS AND FOOD PACKAGING USE

This application is a division of application Ser. No. 171,063 filed Mar. 21, 1988, now U.S. Pat. No. 4,882,201.

CROSS REFERENCE TO RELATED APPLICATION

Reference is made to copending application 60-SI1212, for Eckberg, "UV Curable Epoxy Functional Silicones", incorporated herein by reference and assigned to the same assignee as the present invention.

BACKGROUND OF THE INVENTION

The present invention relates to certain non-toxic alkoxy substituted aryl onium salts, such as diaryliodonium salts, and their use in making UV curable non-toxic coating compositions. More particularly, the present invention relates to a method of treating various metal and plastic substrates with non-toxic UV curable oxirane containing materials to render them suitable for food packaging.

Prior to the present invention, metallic and plastic substrates used in food packaging were generally coated with non-toxic curable compositions, such as heat curable epoxy-phenolics. Organic solvent solutions of various organic resins also have provided an alternative non-toxic surface in food applications. However, presently available procedures are economically unattractive because of the high input energy required, or environmentally unsatisfactory due to the presence of organic solvents. The food industry is constantly seeking alternative methods for packaging food. The preferred procedures would be less energy intensive and faster under continuous conditions.

UV curable resins, such as solventless epoxy resins, have many desirable characteristics. For example, such resins are fast curing, environmentally safe, and require little energy to effect cure. As taught by British Pat. Nos. 1,516,351 or 1,516,352, or U.S. Pat. No. 4,058,401, Crivello, incorporated herein by reference, diaryliodonium salts and triarylsulfonium salts are very effective photoinitiators for epoxy resins. However, the use of triarylsulfonium and diaryliodonium salts as photoinitiators has been limited, because those materials, for example, diphenyliodonium hexafluororoantimonate are extremely or very toxic materials.

As used hereinafter, the term "toxicity" or "very toxic", or "extremely toxic" will be used in accordance with the definitions shown in Clinical Toxicology of Commercial Products, fifth edition, (1984) of Robert E. Gosselin et al., Williams & Wilkins, Baltimore, on page 2, Section 1. An oral dose of 5–50 mg/kg (weight of animal tested) would be lethal to 50% of the test subjects and would be classified as extremely toxic, while a 50–500 mg/kg dosage would be classified as very toxic. Although Gosselin et al. refers to human usage, comparable studies with laboratory animals have shown that diphenyliodonium hexafluoroantimonate exhibits an Acute Oral Toxicity (LD$_{50}$) (TSCA 7/79) of 25 mg/kg. The comparable 4-methoxy substituted analog exhibits a 296–385 mg/kg rating over a three day period.

For handling purposes in industry, a rating of 5000 mg/kg or 5 g/kg or greater would be considered "non-toxic". For example, table salt has a rating of 3750 mg/kg.

In addition to toxicity, the aforementioned hexafluorometalloid diaryliodonium salts also have been found to be substantially incompatible with solventless epoxy resins particularly oxirane containing organosiloxanes.

The present invention is based on our discovery that certain alkoxy substituted aryl onium salts have been found to be non-toxic, particularly diaryliodonium hexafluorometalloid salts, having at least one nuclear bound-OR group attached by a carbon-oxygen linkage to an aryl nucleus of the diaryliodonium hexafluorometalloid salt, where R is an alkyl radical having a value of at least 8. It has been further found that when the diaryliodonium hexafluoro- metalloid salt is substituted with an —OR group, where R has a value of 10–20, the resulting salt is a readily, synthesizable crystalline material having a melting point in the range of 50° to 100° C., while salts having —OR groups where R is C$_8$ or less are more difficult to purify, since they are oils.

STATEMENT OF THE INVENTION

There is provided by the present invention a method of coating a substrate suitable as a food liner, or useful in food packaging to produce a tack-free coated surface on the substrate treated which comprises:

(1) treating the surface of the substrate, such as a metal or plastic, in a continuous manner with a solventless substantially non-toxic composition comprising,
  (A) a non-toxic oxirane containing organic resin or silicone monomer or resin and
  (B) an effective amount of a non-toxic aryl onium hexafluorometalloid salt
(2) thereafter irradiating the treated substrate surface of (1) with ultraviolet light or visible light until the treated substrate surface is rendered tack-free, where the non-toxic arylonium salt is selected from the class consisting of phosphates, arsenates and antimonates, and at least one of the aryl radicals of the arylonium salts is substituted with a nuclear bound OR-group attached to the aryl nucleus by a carbon-oxygen linkage, R is an alkyl radical having a value of at least 8 carbon atoms, and preferably from 10–20 carbon atoms.

Some of the diaryliodonium salts which can be used in the practice of the present invention are for example,

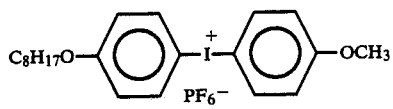

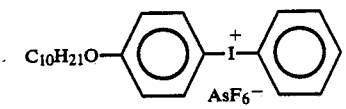

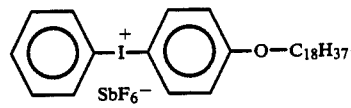

-continued

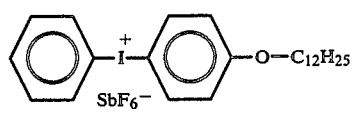

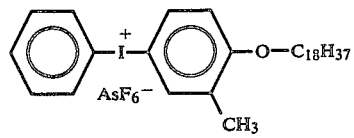

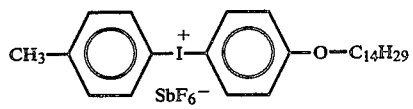

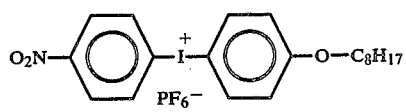

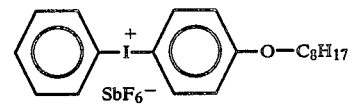

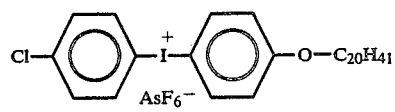

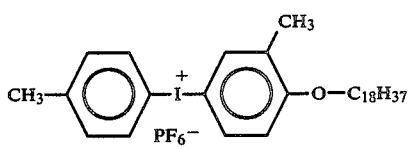

Some of the triaryliodonium salts which can be used are, for example,

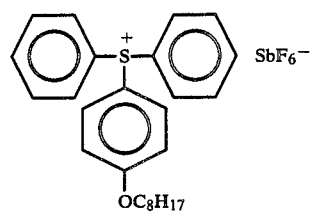

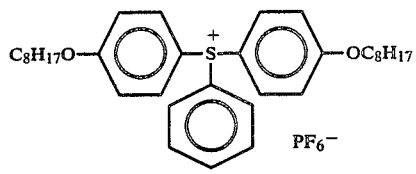

-continued

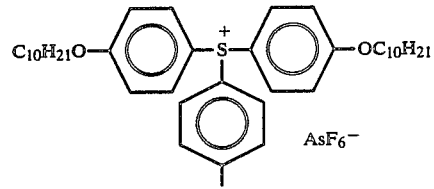

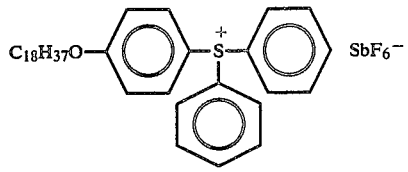

The above triarylonium salts which can be used in the practice of the invention can be made by the method shown by Crivello et al. in U.S. Pat. No. 4,238,619. For example, a diarylsulfide such as diphenylsulfide can be arylated with a diaryliodonium salt in the presence of a catalytic amount of a copper compound such as copper benzoate. The diarylsulfide can be made by effecting reaction between an appropriate alkylhaloaryl ether with a thiophenol using the Ullman reaction.

In addition to the aryl onium salts cited above, the instant invention is also intended to include other non-toxic aryl onium salts such as; triarylsulfoxonium salts, diaryliodosonium salts, aryl-substituted phosphonium salts, aryl-substituted ammonium or heterocyclic nitrogen salts, and ferrocenium salts substituted with at least one —OR group as previously defined.

Among the non-toxic oxirane containing resins which can be used to make the non-toxic coating compositions of the present invention are, for example, aliphatically unsaturated oils and materials which can be epoxidized using the peracid process as shown by Wahlroos, U.S. Pat. No. 2,813,878. Additional details about the non-toxic oxirane containing resins can be found in the *Handbook of Epoxy Resins* by Neville, pp. 3-9 to 3-24, 1967, McGraw-Hill, Inc. There can be used, for example, epoxidized soybean oil, epoxidized linseed oil, epoxidized rapeseed oil, epoxidized tall oil, epoxidized sunflower oil, epoxidized polybutadiene, bisphenol A-diglycidyl ether resins, 3,4-epoxycyclohexylmethyl-3', 4'-epoxycyclohexane carboxylate, epoxy novolak resins, copolymers of glycidyl acrylate and methacrylate with styrene, methyl methacrylate, vinyl acetate and other vinyl monomers, epoxidized linoleic acid dimer, and epoxyfunctional polydimethylsiloxanes.

The UV curable or coating compositions of the present invention can be made by merely combining the arylonium salt with the oxirane containing resin. An effective amount of the arylonium salt is from about 0.01% to 20% by weight based on the weight of the coating composition, and preferably 0.1% to 10% by weight. Substrates which can be coated in accordance with the practice of the present invention are for example, plastic substrates such as: polystyrene, polyethylene, polypropylene, polyvinyl chloride, polyvinylidine chloride, polycarbonate polyphenylene oxide, polysulfone, polyethylene terephthalate, cellulose acetate, polyvinyl alcohol, metal substrates such as: aluminum, iron, steel, copper, brass, gold, platinum, nickel and chromium. In addition, glass and paper substrates also can be used. Application of the UV curable coating composition onto a substrate can be achieved by: roll coating, curtain coating, screen printing, gravure coating, dip coating and knife coating and off-set printing.

Irradiation of substrates treated in accordance with the practice of the invention can be achieved by the use of UV lamps such as: mercury arc lamps (high, medium and low pressure, Xenon arc lamps, high intensity halogen-tungsten arc lamps, microwave driven arc lamps, and lasers. Additional means of irradiation which can be used are, for example, ionizing irradiation using $^{60}Co$ which can simultaneously sterilize and cure the non-toxic irradiation curable coating composition. In this manner, edible substrates such as fruit can be simultaneously cured and sterilized.

In order that those skilled in the art will be better able to practice the present invention, the following examples are given by way of illustration and not by way of limitation. All parts are by weight.

EXAMPLE 1

A mixture of 224 grams (3 mols) of phenol in the form of a 88% aqueous solution, 193 grams (1 mol) of 1-bromooctane, 30 grams of tetra-n-butylammonium bromide, 224 grams (3 mols) of potassium hydroxide pellets, 500 ml of water and 500 ml of toluene was stirred under a nitrogen atmosphere while it was refluxing for a period of 16 hours. The reaction mixture was allowed to cool and the organic phase was washed with 500 ml, 0.5N sodium hydroxide to remove excess phenol. The toluene layer was washed with two 500 ml portions of water and the toluene was removed using a rotary evaporator. A quantitative yield of 98% pure octylphenyl ether was obtained based on gas chromotogrpahy and method of preparation.

There was added dropwise with stirring, 520 grams (2.4 mols) of 35% peracetic acid to 208 grams (1 mol), 98% pure iodobenzene. The temperature of the mixture was maintained between 40° and 45° C. during the addition using a water bath. After addition was complete, the temperature of the mixture was maintained at 40° C. for one hour. A yellow solution was obtained upon completion of the addition. After about 20 minutes, a precipitate of iodosobenzene diacetate begin to form and the solution became quite thick. Maintaining the reaction mixture at 40° C., there was gradually added 290 grams (1.57 mol) of p-toluene sulfonic acid. As the reaction proceeded, the solution became perceptably more fluid and then once again thixotropic. The product, phenyliodoso tosylate precipitated. The reaction temperature was maintained at 40° C. for two hours after addition had been completed. The product was isolated by suction filtration. It was obtained in an 84-97% yield.

There was added 5 ml of acetonitrile followed by 1.5 ml of glacial acetic acid as a catalyst to a mixture of 24.5 grams (0.0625 mol, 20% excess) of phenoiodoso tosylate and 01.3 grams (0.5 mol) of octyl phenyl ether. Upon addition of the acid with stirring, a deep green color was formed. The reaction mixture was heated and stirred at 40° C. for two hours. During this period, the initial heterogeneous solution became homogeneous with the formation of a yellow-orange solution. The solution was cooled and there were added 150 ml of water. The product crystallized from the oil and was isolated by suction filtration. It was washed thoroughly with water followed by a small amount of n-heptane. After air drying, the yield of the product was 25.5 grams (95%) with a melting point of 115°-118° C. After recrystallization from a toluene/n-heptane mixture, melting point of the product was raised to 119°-121° C. Based on method of preparation, the product was (4-octyloxyphenyl) phenyliodonium tosylate.

There was added 1600 ml of acetone with stirring, to a mixture of 747.6 grams (1.28 mol) the above tosylate salt and 333.6 grams (1.28 mol) sodium hexafluoroantimonate. The mixture was stirred for one hour at room temperature. The sodium tosylate was filtered off and the volume of the acetone solution reduced on a rotary evaporator to approximately one third. The acetone solution was then poured into distilled water. The aqueous layer was decanted from the oil which formed. The oil was then washed with 3 × 100 ml portions of water. On cooling and stirring, the oil crystallized. The product was purified by dissolving in a minimum amount of methanol and triturating with a large quantity of water. A crystalline product was obtained by filtering and washing the isolated product with water followed by drying at 40° C. in a vacuum oven. There was obtained an 82-94% yield of (4-octyloxyphenyl)phenyliodonium hexafluoroantimonate having a melting point of 59°-61° C.

An acute oral toxicity study in accordance with EPA GLP Regulations, 40 CFR, Part 792, 1973 showed that (4-octyloxyphenyl)phenyliodonium hexafluoroantimonate was non-toxic. It did not produce a toxic oral effect in rats over a 14 day observation period when initially administered at a dosage of 5 g/kg.

The same procedure was repeated except that in place of the octyl phenyl ether, anisole was used as a reactant. Based on method of preparation there was obtained (4-methoxyphenyl)phenyliodonium hexafluoroantimonate. An acute oral toxicity ($LD_{50}$) study with rats, in accordance with (TSCA 7/79) showed that the (4-methoxyphenyl)phenyliodonium hexafluoroantimonate was very toxic.

A single oral dosage at levels of 135 to 355 mg/kg was found to be lethal over a period of 1-5 days.

A non-toxic UV curable mixture was prepared by stirring 98 parts of epoxidized linseed oil "Drapex ®" of the Witco Co., Brooklyn, N.Y. having a $LD_{50}$ rating of 32 gm/Kg and 2 parts of (4-octyloxyphenyl)phenyliodonium hexafluoroantomonate. Various 4"×4"×0.1" substrates, such as aluminum, glass, steel, LEXAN polycarbonate and polyethylene terephthalate were knife coated with the non-toxic UV curable mixture. The treated samples were then cured by passing them through a model QC 1202 UV processor obtained from the RPC Equipment company at a speed of 250 ft/minute. The apparatus was equipped with two 12 inch medium pressure 300W mercury arc lamps mounted perpendicular to the direction of travel of the conveyer. Lamps were operated at 380 volts and 6.8±0.8 amps. The substrates were found to be tack-free with hard, transparent adherent films with good gloss and suitable for packaging foods.

EXAMPLE 2

The procedure of Example 1 was repeated to prepare (4-decyloxyphenyl)phenyliodonium hexafluoroantimonate. 1-bromodecane was used and the yield of decyl phenyl ether was 98.9%. In accordance with Example 1, 196 grams (0.5 mol) of phenyliodoso tosylate, 117 grams (0.5 mol) of the decyl phenyl ether, 50 ml of acetic acid and 200 ml of dichloromethane were stirred at 40° C. for 2 hours. The reaction mixture was filtered and a solution triturated with ether. The crystallized product was isolated by suction filtration and washed with ether and then dried under vacuum. There was obtained, 205.3 grams (67.5% yield of (4-decyloxyphenyl)phenyliodonium tosylate.

There were combined 205.3 grams (0.33 mol) of the above tosylate salt with 90 grams (0.35 mol) of sodium hexafluoroantimonate and 1000 ml hot acetone. Precipitation of the sodium tosylate occurred immediately and the mixture was stirred for 1 hour. The solution was filtered and the filtrate triturated with water. The product, (4-decyloxyphenyl)phenyliodonium hexafluoroantimonate crystallized directly and was filtered and washed with water. Further purification was accomplished by recrystallization from methanol/water. An 82% yield of pure product was obtained with a melting point of 74°–76° C.

An acute oral toxicity study was undertaken in accordance with EPA GLP regulations, 40 CFR, part 792, 1983. It was found that rats tested at an oral dosage level of 5 grams/per kilogram did not produce a toxic effect. All test animals survived the 14 day test period. No animals showed any clinical signs of toxicity and gained weight during the coarse of the study.

A non-toxic UV curable mixture was prepared by combining 98 parts of epoxidized polybutadiene epoxy resins with 2 parts of the above (4-decyloxyphenyl)phenyliodonium hexafluoroantimonate. The non-toxic UV curable mixture was found to produce a tack-free substrate on plastic, steel, glass and aluminum as shown in Example 1. Non-toxic tack-free films were obtained which were hard, transparent with good gloss.

EXAMPLE 3

In accordance with the procedure of Example 1, octadecyl phenyl ether was prepared and a quantitative yield was obtained. There was added 50 ml of glacial acetic acid to a mixture of 196 grams (0.5 mol) of phenyliodoso tosylate and 173 grams (0.5 mols) of octadecyl phenyl ether dissolved in 200 ml dicholoromethane. After 1 hour stirring at 40° C., the reaction mixture was filtered then triturated with ether. A product, (4-octadecyloxyphenyl)phenyliodonium tosylate crystallized from solution and was recovered by filtration. There was obtained 340 grams (94.4% yield). The entire amount of the tosylate salt was dissolved in 1000 ml of hot acetone and 125 grams of sodium hexafluoroantimonate was added. The reaction mixture was stirred for 1 hour and the solution filtered to remove the sodium tosylate. The main filtrate was triturated with water and a white crystalline product (4-octadecyloxyphenyl)phenyliodonium hexafluoroantimonate was obtained. Recrystallization from ethanol/water gave the pure iodonium salt having a melting point of 94° C. and an 83% yield. The acute oral toxicity of this photoinitiator was found to be greater than 5 g/kg. No toxic effects were observed during the 14 day test period and all the test animals (rats) gained weight during the test period.

A non-toxic UV curable mixture was prepared by mixing together 99 parts of Ciba Geigy cycloaliphatic epoxy resin CY179, (3,4-epoxycyclohexylmethyl-3″,4″-epoxycyclohexane carboxylate) epoxy resin and 1 part of the above iodonium salt. A non-toxic tack-free film was obtained on irradiation for 10 seconds using a GE H3T7 medium pressure mercury arc lamp.

The above examples are directed to only a few of the very many variables to which the non-toxic compositions are directed, as well as to the substrates treated with such compositions and thereafter irradiated. Additional examples of UV coating compositions and methods of use are shown in the description preceding these examples. In addition, the aryl onium salts of the present invention can be made from additional source materials to provide aryl onium salts having chemically combined $C_{(6-13)}$ aryl radicals, such as phenyl tolyl or naphthyl substituted with at least one —OR group as previously defined.

What is claimed is:

1. A solventless UV curable mixture having an acute oral toxicity value ($LD_{50}$) of 5 grams/kilogram or greater comprising,
   (a) an oxirane containing organic or silicone resin and
   (b) an effective amount of a diaryliodonium hexafluorometalloid salt selected from the class consisting of phosphates, arsenates and antimonates having at least one nuclear bound —OR radical attached to an aryl radical of the disryliodonium hexafluorometalloid salt, where R is an alkyl radical having from 8-20 carbon atoms.

2. A UV curable mixture in accordance with claim 1 where the diaryliodonium hexafluorometalloid salt is a diaryliodonium hexafluoroantimonate salt.

3. A UV curable mixture in accordance with claim 2, where R is octyl in the nuclear bound —OR radical attached to the aryl radical of the diaryliodonium hexafluroometalloid salt.

* * * * *

UNITED STATES PATENT AND TRADEMARK OFFICE
CERTIFICATE OF CORRECTION

PATENT NO. : 4,981,881

DATED : January 1, 1991

INVENTOR(S) : James V. Crivello and Julia L. Lee

It is certified that error appears in the above-identified patent and that said Letters Patent is hereby corrected as shown below:

Column 3, line 45, cancel "triaryliodonium" and substitute -- triarylsulfonium --

Signed and Sealed this

Twenty-fifth Day of August, 1992

Attest:

DOUGLAS B. COMER

Attesting Officer

Acting Commissioner of Patents and Trademarks